United States Patent [19]
Wölber et al.

[11] Patent Number: 4,470,066
[45] Date of Patent: Sep. 4, 1984

[54] CIRCUIT ARRANGEMENT FOR ADJUSTING THE DIRECT CURRENT LEVEL OF A VIDEO SIGNAL

[75] Inventors: Jörg Wölber, Pinneberg; Dieter J. Kunze, Kaltenkirchen; Friedrich E. Hahn; Walter Demmer, both of Hamburg, all of Fed. Rep. of Germany

[73] Assignee: U.S. Philips Corporation, New York, N.Y.

[21] Appl. No.: 374,452

[22] Filed: May 3, 1982

[30] Foreign Application Priority Data

May 2, 1981 [DE] Fed. Rep. of Germany ....... 3117457
Apr. 21, 1982 [DE] Fed. Rep. of Germany ....... 3214756

[51] Int. Cl.³ ............................................. H04N 5/16
[52] U.S. Cl. .................................................. 358/171

[58] Field of Search ..................... 358/171, 34; 330/11, 330/9; 328/173, 169; 307/238.3

[56] References Cited

U.S. PATENT DOCUMENTS 3,985,954 10/1976 Kuniyoshi et al. ................. 358/171

Primary Examiner—John C. Martin
Assistant Examiner—John K. Peng
Attorney, Agent, or Firm—Thomas A. Briody; William J. Streeter; Edward W. Goodman

[57] ABSTRACT

A charging current source and a discharging current source are alternately connected to an input capacitor. By choosing the current ratios it is possible to switch a reference level located in the signal range, for example the black level in a television signal, in the circuit, without the necessity for interval keying.

8 Claims, 7 Drawing Figures

CIRCUIT ARRANGEMENT FOR ADJUSTING THE DIRECT CURRENT LEVEL OF A VIDEO SIGNAL

BACKGROUND OF THE INVENTION

The invention relates to a circuit arrangement for controlling the direct current level of a video signal, comprising a limit value stage (threshold circuit) for deriving from the video signal a periodic switching signal, and a storage means charging/discharging circuit which by means of the switching signal, provides charging or discharging of a storage means to control the direct current level by means of a value stored in the storage means.

DE-AS 2,365,509 discloses a circuit arrangement of the above-described type in which, by means of the switching signal, a discharge of the storage means is effected during a portion of a period when the direct current level is too high, or a charging when the direct current level is too low. Charging or discharging is determined by comparing a reference level of the video signal with an instantaneous level during the above-mentioned portion of the switching signal period.

SUMMARY OF THE INVENTION

The invention has for its object to provide an improvement to this circuit arrangement.

According to the invention, a circuit arrangement of the above-mentioned type, is characterized in that the limit value stage produces a switching signal in which the duty cycle depends on the direct current level of the video signal and the switching signal causes in each period a charging and a discharging of the storage means, so that the control is a duty cycle control.

In accordance with the measure of the invention, the adjustment does not depend on the reference level of the video signal during the sampling period, so that disturbances in this level can not exercise any influence.

It should be noted that from DE-OS 3,016,092 a duty cycle adjustment is known per se to make the phase of the output signal of a phase control circuit independent of amplitude variations of the input signal.

In a circuit arrangement in accordance with the invention a capacitor may be used as the storage means, to which alternatively a charging or a discharging current is applied. For a digital signal, an adder stage (accumulator) may be employed as the storage means to which, during the individual partial intervals corresponding to a sampling signal of a higher frequency, a more positive or a more negative value is applied for such a period of time that either the one or the other state of the switching signal occurs at the output of the limit value amplifier, the output signal of the adder stage being applied to the second input of the limit value amplifier.

In accordance with a further embodiment of the invention the signal and the storage means content can be added together by means of the series arrangement of a storage capacitor and the signal source, the switching contact of a change-over switch being preferably connected to that terminal of the storage means which is remote from ground, from which also the signal with a predetermined required value of the reference level is taken, current sources being connected to the fixed contacts and a voltage which determines the desired position of the reference value being connected to the second input of the limit value amplifier.

In this situation the coupling capacitor, by means of which the direct current potentials are separated, functions at the same time as a storage means and, together with the determination of the reference value in an incoming signal, a new predetermined reference value is fed in.

In accordance with a further embodiment of the invention, the mean value occurring at the storage means may be active at the second input of the limit value amplifier. The reference value at the output is then adjusted to zero.

In accordance with a further embodiment of the invention the signal can be applied in digital form to the first input of a comparator, the first or the second value, depending on the sign of its output signal, of two numerical values being applied with opposite signs to an adder stage (accumulator) which serves as a first storage means and the output signal of the adder stage being applied to the second input of the comparator. The reference value thus obtained at the storage means may then be further used in any form, for example, fed into the signal channel by means of a subtracting stage.

In accordance with a preferred embodiment of the invention the relation $$\frac{T_2}{T_3 - T_2} < \frac{s_1}{s_2} < \frac{T_3 - T_1}{T_1} \quad (1)$$

can be at least substantially satisfied at a reference value which is located within the amplitude range of the signal, wherein $T_1$ is the interval, for example, the line synchronizing pulse range, in which the signal is above the reference value, $T_2$ is the interval, for example, the video signal range, in which the signal is located below the reference value, $T_3$ is the period of the signal, $s_1$ is the value which effectively reduces the storage means content in a discharging interval for each unit of time, and $s_2$ is the value which effectively increases the storage means content in a charging interval in each unit of time.

At such an adjustment, the reference value contained in the signal can be obtained also at fluctuating signal amplitudes and without sampling.

The same applies in accordance with a further embodiment of the invention for adjusting a reference value located at the edge of the amplitude range of the signal, for example of the synchronizing pulse peaks in a television signal, when at least the relation $$\frac{T_3 - T_1/4}{T_1/4} > \frac{s_1}{s_2} > \frac{T_3 - T_1}{T_1} \quad (2)$$

is substantially satisfied, wherein $T_1$ is the interval, for example, the line synchronizing pulse peak, in which the signal is at the reference value, $T_3$ is the period of the signal, $s_1$ is the value which effectively reduces the storage means content in a discharging interval in each unit of time, and $s_2$ is the value which effectively increases the storage means content in a charging interval in each unit of time.

Herein $s_1$ and $s_2$ may be determined by current or voltages or also by digital values.

DESCRIPTION OF THE DRAWINGS

The invention will now be further described by way of example with reference to the accompanying drawing, in which.

DESCRIPTION OF THE PREFERRED EMBODIMENTS

Figure 1:
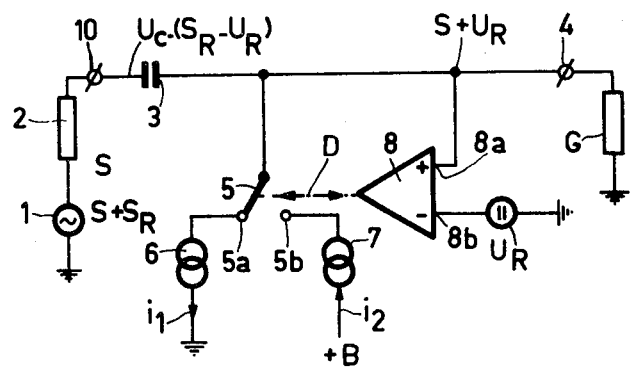
FIG. 1 shows the principle of the invention by means of a block schematic circuit diagram.
Figure 2:
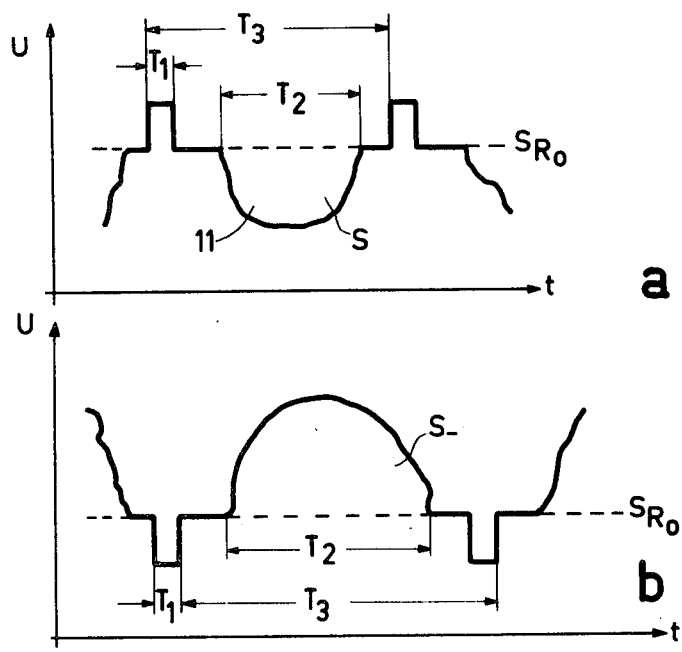
FIGS. 2a and 2b show different signal forms.

In the circuit arrangement shown in FIG. 1, a television video signal S, as shown in FIG. 2a, is applied from a signal source 1 having an internal resistor 2 to the terminal 10, the video signal having positively-going synchronizing pulses, a line period $T_3$, a line synchronizing pulse width $T_1$ and a video signal interval $T_2$. A black level $S_{Ro}$ occurs between the synchronizing pulses and the video signal. This video signal S is applied to an output terminal 4 via a capacitor 3. After the capacitor 3, at the terminal 4, the signal has lost its d.c. voltage component, so that, depending on the picture content, the black level $S_R$ will fluctuate. In accordance with the invention, the signal S is applied to the input 8a (+) of a comparison stage 8 whose other input 8b (−) is connected to ground via a substantially constant limit value voltage $U_R$. The comparison stage 8 is of such a construction that at its output a switching signal D is produced which has a first state $D_1$ when the input signal exceeds the constant voltage $U_R$ which forms a limit value and a second state D− when the input signal S is smaller than this limit value voltage $U_R$.

The switching signal D operates the moving contact of a change-over switch 5 whose fixed contacts 5a and 5b are connected to ground via a first current source 6 and to a positive pole of the 12 volt voltage source +B via a second current source 7, respectively. The switching contact of the change-over switch 5 is connected to one plate of the capacitor 3 and consequently to the output terminal 4, which is connected to a high-ohmic load G which does not exercise any further influence. The other plate of the capacitor 3 is connected to the input terminal 10 and consequently, via the signal source 1 and its low-ohmic terminal resistor 2, to ground.

In the shown position of the moving contact of the change-over switch 5, a discharging current $i_1$ to ground is taken from the capacitor via the current source 6. In the moving contact position not shown a charging current $i_2$ is applied to the capacitor 3 from the voltage source +B. The capacitor 3 then serves as a storage means which balances the applied and discharged charges, respectively, and carries a voltage $U_c$ which corresponds to a mean value. The balanced condition of the applied and discharged charges is reached when the relation $$\frac{T_2}{T_3 - T_2} < \frac{i_1}{i_2} < \frac{T_3 - T_1}{T_1} \tag{1a}$$

is satisfied. Herein $T_1$ is the interval, for example the line synchronizing pulse range, in which the signal S is located above the contained reference values $S_{Ro}$, $T_2$ is the interval, for example the video signal range, in which the signal S is below the reference values $S_{Ro}$, $T_3$ is the period of the signal S, $i_1$ is the current value which effectively reduces the charge of the storage capacitor 3 in a discharging interval, and $i_2$ is the current value which effectively increases the charge in a charging interval.

By means of the switching signal D of the comparator stage 8, the switch 5 is always changed-over when the signal $S_1$ at the output of the capacitor 3 and consequently at the output terminal 4 is above or below the limit value voltage $U_R$. When, owing to a shift of the reference level $S_{Ro}$ in the signal S, a shift of the signal $S_1$ at the output of the capacitor 3 occurs, the current $i_1$ or the current $i_2$ will remain operative for a longer period of time in such a manner that the shift is corrected and the voltage $S_{R1}$ at the output terminal 4 retains the value $U_R$ at the reference level. In a television signal, this reference level corresponds to the black level, so that the next shift can be related to this level.

If a television video signal S− shown in FIG. 2b having negatively-going synchronizing pulses is applied to the capacitor 3 of the signal source 1, then for the voltage U at that electrode of the capacitor 3 which faces the output, the black level $S_{Ro}$ is adjusted to the reference voltage $U_R$, when $i_1$ and $i_2$ are interchanged in the relation (1a).

Figure 3:
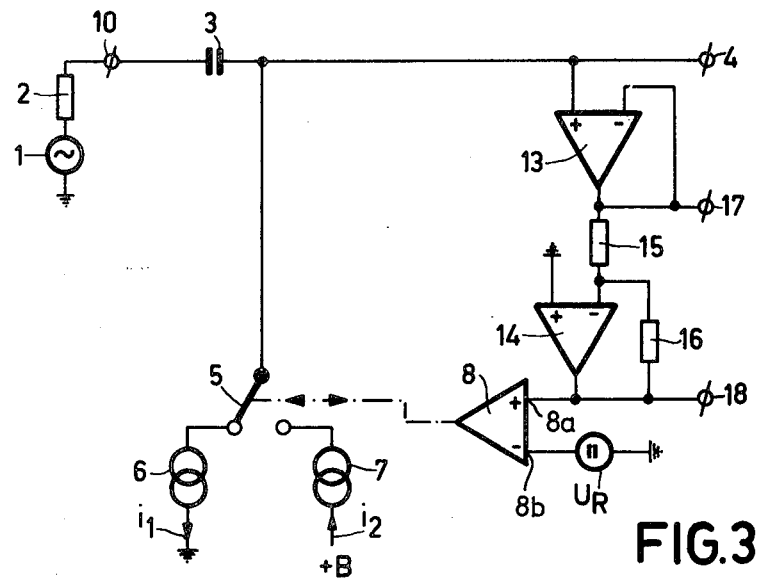
FIG. 3 shows a further embodiment of the circuit by means of a block schematic circuit diagram.

Particularly when the comparator circuit 8 has a low input resistance and/or a low sensitivity, it may be effective, in accordance with FIG. 3, to apply the output voltage at terminal 4 first to an impedance transformer 13 and to a subsequent voltage amplifier 14 and then to the non-inverting input 8a of the comparator circuit 8. When the output signal is applied to the non-inverting input of an operational amplifier 13 whose inverting input is connected to its output terminal, then a very high input and a low output resistance are obtained, so that substantially the voltage from capacitor 3 applied to the input is available at the output as a low-ohmic voltage source. When the output of the amplifier 13 is applied via a resistor 15 to the inverting input of a further operational amplifier 14 whose non-inverting input is connected to ground and whose output is connected to its inverting input via a resistor 16, then at the output of the operational amplifier a voltage, which is amplified in the ratio of $R_{16}/R_{15}$ and is inverted, is obtained, wherein $R_{15}$ and $R_{16}$ are the values of the resistors 15 and 16, respectively. The voltage thus amplified then controls the comparator stage 8, which, for example, also comprises an operational amplifier. This comparator stage 8 must now connect the discharging current source 6 to the capacitor 3 when the voltage $U_R$ is exceeded,—the amplified and inverted voltage at the input 8a of the comparator stage 8 is then decreased to below $U_R$—and the comparator circuit 8 has to connect the current source 7 to the capacitor 3, when the voltage decreases to below $U_R$. (The amplified and inverted voltage at the input 8a of the comparator circuit 8 then exceeds $U_R$.).

Advantageously, in this situation the output signal can be taken from the output 17 of the impedance transformer 13 or, inverted and amplified, from the output 18 of the amplifier 14. At all three output terminals 4, 17 and 18 the reference level of the derived signals corresonds to $U_R$.

So as to ensure that the applied charging and discharging currents, respectively, do not cause a disturbing voltage drop in the input signal, the internal resistor 2 of the signal source 1 must have such a low value that the above-mentioned currents $i_1$ and $i_2$ do not produce an impermissible shift of the reference potential.

If a video signal as shown in FIG. 2a, which must be clamped at its black value, is applied to the circuit shown in FIG. 3 then the relation (1a) can be satisfied.

Figure 4:
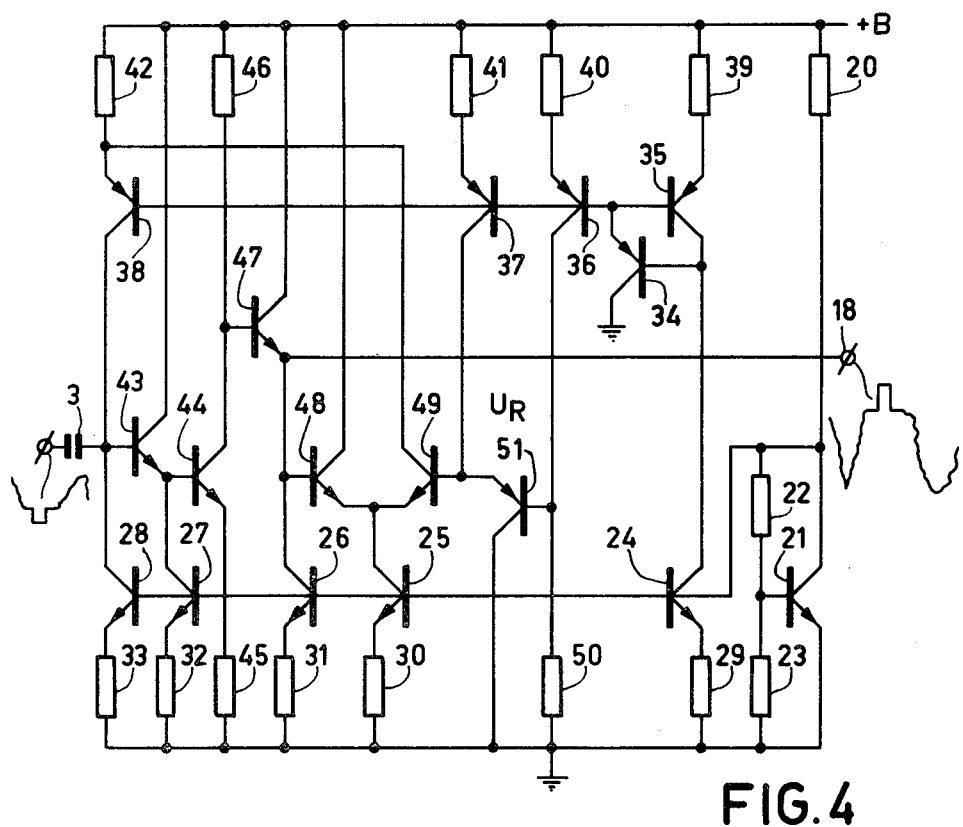
FIG. 4 shows a circuit in accordance with the invention in greater detail.

FIG. 4 shows in greater detail an embodiment of the invention, in which a video signal $S_-$ having negatively-going synchronizing pulses (see FIG. 2b) is applied to the input terminal 10 before the capacitor 3. The operational amplifiers of FIG. 3 are shown in FIG. 4 in the form of simple transistors or transistor-differential amplifiers.

By means of a 22 kOhm resistor 20 arranged between the +B pole of the 12 V voltage source B and the collector of an npn-transistor 21, a stabilized voltage of 1 V is produced at the collector of the transistor 21. This is accomplished in that a 3.3 kOhm resistor 22 connects the collector of the transistor 21 to its base and that on the other hand a 6.8 kOhm resistor 23 is provided between the base of this transistor and ground. The emitter of transistor 21 is also connected to ground.

The voltage thus obtained supplies the bases of the npn-current source transistors 24, 25, 26, 27 and 28, which are connected to ground by means of their respective emitter resistors 29 of 3.3 kOhm, 30 of 7 kOhm, 31 of 7 kOhm, 32 of 7.5 kOhm and 33 of 82 kOhm. The current source transistor 24 supplied two pnp-transistors 34 and 35, a 1 kOhm emitter resistor 39 of the transistor 35 being connected to the +B pole of the supply source B and the collector of transistor 35 being connected to the collector of transistor 24 and to the base of the transistor 34, whose collector is connected to ground. The emitter of the transistor 34 supplies the base of the transistors 35 and the pnp-current source transistors 36, 37, and 38, whose respective emitter resistors 40 of 1 kOhm, 41 of 7 kOhm and 42 of 3.7 kOhm are also connected to +B.

The input signal $S_-$ of the capacitor 3 is applied to the base of an npn-transistor 43, which serves as an emitter follower; its collector being connected to +B and its emitter to the collector of the current source transistor 27.

The signal at the emitter of the transistor 43 is applied to the base of an npn-transistor 44 whose 1 kOhm emitter resistor 45 is connected to ground and whose 15 kOhm collector resistor 46 is connected to +B. From the collector of the transistor 44 the signal is applied to an npn-emitter follower 47 whose collector is connected to +B and the emitter to the collector of the current source transistor 26 and also to the output terminal 18, at which an inverted video signal is produced.

The transistor 43 serves as an impedance transformer, the transistor 44 as an amplifier and inverter, and the transistor 47 finally serves as an impedance transformer for the input signal which as a result thereof is amplified approximately 15 times and inverted. The signal at the emitter of the transistor 47 is applied to a differential amplifier formed by two npn-transistor 48, 49 and the current source transistor 25, more specifically to the base of the transistor 48. The reference voltage $U_R$ is connected to the base of the transistor 49. This reference voltage is produced by feeding the current from the current source transistor 36 into a 14 kOhm resistor 50 which has one end connected to ground. The voltage produced at the resistor 50 is applied as a reference voltage to the base of the transistor 49 via a pnp-emitter follower 51 whose collector is connected to ground and whose emitter is connected to the collector of the current source transistor 37. When the output signal at the terminal 18 decreases to below the reference voltage $U_R$, the transistor 49 becomes conductive and switches off the current source transistor 38, as the collector of the transistor 49 is connected to the emitter of the transistor 38. If the output voltage exceeds the reference voltage, then the transistor 49 is cut off and the current source transistor 38 conducts. The currents of the current source transistors 38 and 28 are applied to that plate of the capacitor 3 which faces the output as the collectors of transistors 38 and 28 are connected to this plate of the capacitor 3. The current $I_{28}$ of the transistor 28 then continuously discharges the capacitor 3, while the current $I_{38}$ of the transistor 38 charges the capacitor 3 only then when the output voltage is higher than the reference voltage. If here the condition $$\frac{T_2}{T_3 - T_2} < \frac{I_{28}}{I_{38}} < \frac{T_3 - T_1}{T_1} \qquad (1b)$$

is satisfied, then the reference lvel in the output signal is clamped onto the reference voltage.

Figure 5:
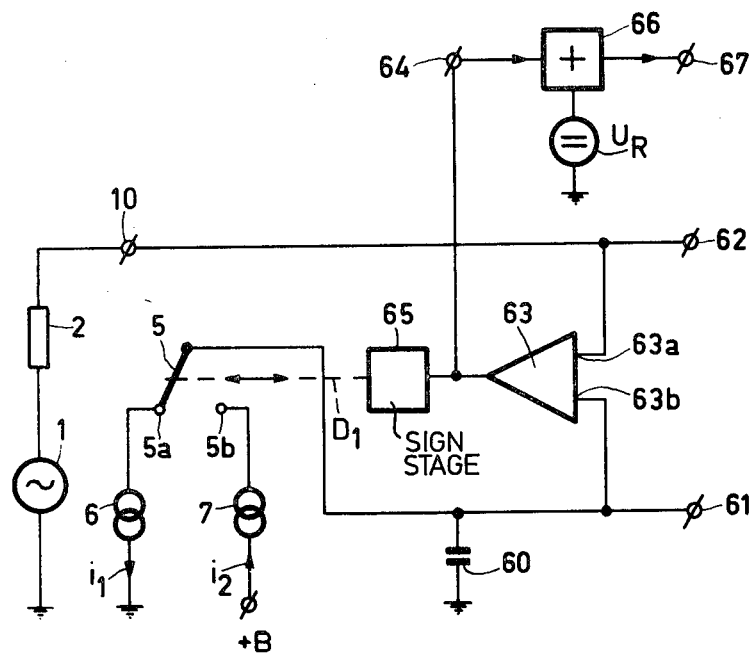
FIG. 5 shows a further embodiment by means of a block schematic circuit diagram.

FIG. 5 shows another embodiment of the invention in which the reference value $S_{Ro}$ contained in the signal S supplied from the terminal 10 is obtained, separated from the signal channel, at a capacitor 60 whose other side is connected to ground and at a terminal 61 connected to this capacitor 60.

The signal S from the source 1 having the internal resistor 2 is supplied, just as in FIG. 1, via the input terminal 10, which is here directly connected to the output terminal 62. In addition, this signal S is applied to the (+) input 63a of a differential amplifier 63 to whose (−) input 63b the capacitor 60 is connected. When, in accordance with the invention, a voltage which is equal to the instantaneous reference level $S_{Ro}$ in the signal S of the source 1, is obtained at the capacitor 60, then a signal in which the reference level has been adjusted to the value zero is produced at the output terminal 64, which is connected to the output of the differential amplifier 63.

The signal at the output of the differential amplifier 63, which is further connected to a sign stage 65, fluctuates around this zero value, in accordance with the signal S supplied by the source 1. The sign stage 65 supplies at its output a switching signal $D_1$ which assumes a first value when the signal S applied to the stage 65 is positive and a second value when the signal S is negative. This switching signal $D_1$ actuates, as in FIG. 1, the moving contact of the change-over switch 5 whose center contact is here connected to the capacitor 60, while one fixed contact 5a is connected to ground via the current source 6 which withdraws the current $i_1$, and the fixed contact 5b is connected to the 12 volts supply source pole +B via the current source 7 which supplies the current $i_2$. As in FIG. 1, the change-over switch 5, 5a, 5b can be realized in the form of an electronic stage, which will be explained with reference to, for example, FIG. 4.

The signal occurring at the output terminal 64 and having a reference level $S_{R2}$ which is clamped on the zero level can be applied to an adder stage 66, whose other input is connected to a voltage source $U_R$. In the signal then obtained at the output 67, the reference value $S_{R2}$ always has the value $U_R$, independent of the position of the reference level in the signal supplied by the source 1.

Depending on the sign of the signal at the output of the differential amplifier 63, the circuit shown in FIG. 5 either applies a charging current $i_2$ to the capacitor 60 or withdraws a discharging current $i_1$ therefrom. The value of the reference level adjusts itself then in such a manner, that in accordance with the formula (1) the integrals of the currents $i_1$ and $i_2$ cancel each other in accordance with the instanteneous moments in which the input signal is located above or below the reference level.

Figure 6:
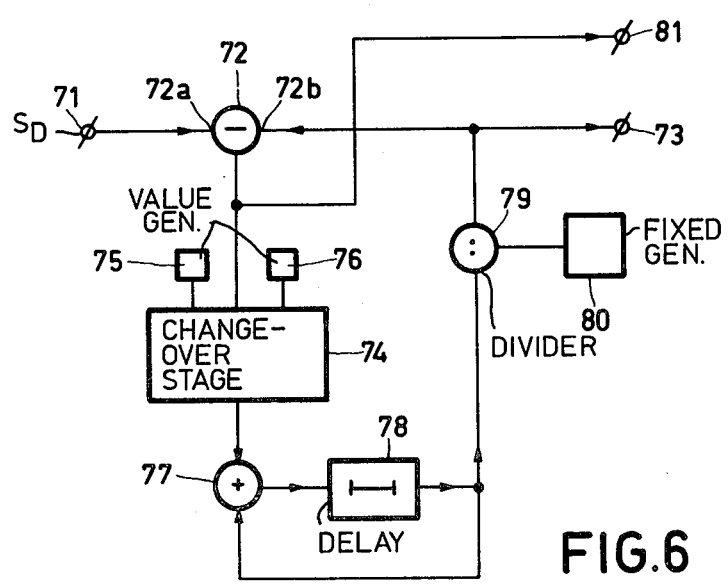
FIG. 6 shows an embodiment in digital technique.

FIG. 6 shows an embodiment of the invention for a digital video signal $S_D$ which is applied to the terminal 71, possibly in time-division multiplex or simultaneously through several channels. This signal $S_D$ is applied to a subtractor (comparator) 72 whose other input carries a digital signal which corresponds to the reference value and which can be taken from the output terminal 73.

The difference between the input signal $S_D$ on the terminal 71 and the mean value of the reference value occurring on the terminal 73, which mean value is determined by means of the circuit in accordance with the invention, is applied to a change-over stage 74 in which, depending on the sign of this difference, a first value generating means 75 having the value $s_1 = 2$ or, as the case may be, a second value generating means 76 having the value $s_2 = -13$ is connected to the first input of an adder stage 77, to whose output a delay stage 78 is connected whose output is connected to the second input of the adder 77 and via a divider 79 to the output 73. The divider 79 is adjusted to a constant divisor, for example 2048, by means of, for example, a fixed value generating means 80.

In the delay stage 78 the value received from the output of the adder 77 is delayed by one cycle of the digital signal, so that the stages 77 and 78 together operate as an adder, at whose output the sum of all the applied input signals recurrently appears.

During operation, during a portion of a signal period $T_3$, positive values, and during another portion of the signal period negative values, are applied to the adder 77, 78 in accordance with the chosen rate, so that a mean value is obtained at its output. So as to obtain a delay of the influences on the input of the subtracting stage 72, this mean value is scaled down in accordance with a high factor via the divider 79. This can be effected in a simple manner by an arithmetic shift.

When in the circuit of FIG. 6 the values of the value generating means 75 and 76 for $s_1$ and $s_2$, respectively, are chosen such that the relation $$\frac{T_3 - T_1/4}{T_1/4} > \frac{s_1}{s_2} > \frac{T_3 - T_1}{T_1}$$

is satisfied, also a reference value, for example the pulse peak of a television signal, which reference value is located at the edge of the amplitude range of the signal $S_D$, can be determined by means of this arrangement, wherein $T_1$ is the interval, for example the line synchronizing pulse peak, in which the signal is at the reference value.

$T_3$ is the period of the signal, $s_1$ is the value which effectively reduces the storage content in a discharging interval per time unit and $s_2$ is the value which effectively increases the storage content in a charging interval in each unit of time.

The signal having the reference level clamped onto the zero value might be taken from the output of the subtracting stage 72 and applied to an output 81. If so desired it would then be possible, as in FIG. 5 to introduce a desired value for the reference level by means of an additional adder stage.

So, with a circuit as shown in FIG. 6 both the black level and consequently the pulse base and also the pulse peak in a television signal can be determined. From this it is possible to derive the geometrical mean value which can then be used as a threshold for the separation of the synchronizing pulses in the further circuit arrangement.

We claim:

1. A circuit arrangement for controlling the direct current level of a video signal comprising a limit value stage for deriving from the video signal a periodic switching signal, a storage means and a storage means charging/discharging circuit which by means of the switching signal, provides charging or discharging of the storage means to control the direct current level by means of a value stored in the storage means, characterized in that the limit value stage produces a switching signal in which the duty cycle depends on the direct current level of the video signal and the switching signal causes in each period a charging and a discharging of the storage means so that the control is a duty cycle control.

2. A circuit arrangement as claimed in claim 1, characterized in that said storage means comprises a capacitor and said charging/discharging circuit comprises constant-value generating means for alternately applying a charging or a discharging current, respectively, to said capacitor.

3. A circuit arrangement as claimed in claim 1 wherein said video signal is a digital signal, characterized in that said storage means comprises an adder stage, a positive or a negative value being repeatedly applied to this adder stage in accordance with a sampling signal of a higher frequency for such a long period of time that either the one or the other state of the switching signal occurs at the output of the limit value stage, the output signal of the adder stage being applied to the second input of the limit value stage.

4. A circuit arrangement as claimed in claim 1, 2 or 3, characterized in that the mean value occurring at the storage means is operative at the second input of the limit value stage.

5. A circuit arrangement as claimed in claim 4, characterized in that the signal is applied in digital form to a first input of a comparator and that, depending on the sign of its output signal, the first or the second one of two numerical values are applied with opposite signs to an adder stage which serves as the first storage means and that the output signal of the adder stage is applied to a second input of the comparator via a fixed divider.

6. A circuit arrangement as claimed in claim 1, 2 or 3, characterized in that at a reference value ($S_{Ro}$) located within the amplitude range of the signal (S), the relation $$\frac{T_2}{T_3 - T_2} < \frac{S_1}{S_2} < \frac{T_3 - T_1}{T_1}$$

is at least substantially satisfied, wherein
- $T_1$ is the interval in which the signal (S) is located above the reference value ($S_{Ro}$),
- $T_2$ is the interval in which the signal is located below the reference value ($S_{Ro}$),
- $T_3$ is the period of the signal (S),
- $S_1$ is the value which effectively reduces the storage content in a discharging interval per unit of time, and
- $S_2$ is the value which effectively increases the storage content in a charging interval per unit of time.

7. A circuit arrangement as claimed in claim 5, characterized in that for adjusting a reference value ($S_{Ro}$) which is located at the edge of the amplitude range of the signal (S) the relation $$\frac{T_3 - T_1/4}{T_1/4} > \frac{S_1}{S_2} > \frac{T_3 - T_1}{T_1}$$

is at least substantially satisfied, wherein
- $T_1$ is the interval in which the signal (S) is at the reference value ($S_{Ro}$),
- $T_3$ is the period of the signal (S),
- $S_1$ is the value which effectively reduces the storage content in a discharging interval per unit of time, and
- $S_2$ is the value which effectively increases the storage content in a charging interval per unit of time.

8. A circuit arrangement as claimed in claim 1, characterized in that said storage means comprises a capacitor having a first terminal to which said video signal is applied; said charging/discharging circuit comprises a change-over switch having a moving contact, connected to a second terminal of said capacitor, and first and second fixed contacts, and oppositely conducting current sources connected respectively to said first and second fixed contacts; and said limit value stage comprises an amplifier having a first input coupled to the second terminal of said capacitor, and a second input coupled to a reference voltage for generating said periodic switching signal for controlling the moving contact of said change-over switch.

* * * * *

UNITED STATES PATENT AND TRADEMARK OFFICE
CERTIFICATE OF CORRECTION

PATENT NO. : 4,470,066

DATED : Sept. 4, 1984

INVENTOR(S) : JORG WOLBER ET AL

It is certified that error appears in the above-identified patent and that said Letters Patent is hereby corrected as shown below:

Column 8, Claims 4 and 6, line 1, change "or 3" to --, 3 or 8--.

Signed and Sealed this

Fourteenth Day of May 1985

[SEAL]

Attest:

DONALD J. QUIGG

Attesting Officer     Acting Commissioner of Patents and Trademarks